United States Patent
Bentley et al.

(10) Patent No.: US 8,770,034 B2
(45) Date of Patent: Jul. 8, 2014

(54) PACKAGED SENSOR WITH MULTIPLE SENSORS ELEMENTS

(75) Inventors: Ian Bentley, New Ipswich, NH (US); Lamar Floyd Ricks, Lewis Center, OH (US)

(73) Assignee: Honeywell International Inc., Morristown, NJ (US)

(*) Notice: Subject to any disclaimer, the term of this patent is extended or adjusted under 35 U.S.C. 154(b) by 479 days.

(21) Appl. No.: 13/226,370

(22) Filed: Sep. 6, 2011

(65) Prior Publication Data

US 2013/0055821 A1    Mar. 7, 2013

(51) Int. Cl.
*G01L 9/06* (2006.01)
*G01L 7/00* (2006.01)

(52) U.S. Cl.
USPC .................. 73/721; 73/715; 73/754

(58) Field of Classification Search
None
See application file for complete search history.

(56) References Cited

U.S. PATENT DOCUMENTS

| | | | |
|---|---|---|---|
| 3,484,732 A | 12/1969 | Postma | |
| 4,222,277 A | 9/1980 | Kurtz et al. | |
| 4,478,076 A | 10/1984 | Bohrer | |
| 4,478,077 A | 10/1984 | Bohrer et al. | |
| 4,501,144 A | 2/1985 | Higashi et al. | |
| 4,528,855 A | 7/1985 | Singh | |
| 4,574,640 A | 3/1986 | Krechmery | |
| 4,581,928 A | 4/1986 | Johnson | |
| 4,651,564 A | 3/1987 | Johnson et al. | |
| 4,683,159 A | 7/1987 | Bohrer et al. | |
| 4,790,192 A | 12/1988 | Knecht et al. | |
| 4,845,649 A | 7/1989 | Eckardt et al. | |
| 4,879,903 A * | 11/1989 | Ramsey et al. | 73/431 |
| 4,986,127 A | 1/1991 | Shimada et al. | |
| 5,042,307 A | 8/1991 | Kato | |
| 5,050,429 A | 9/1991 | Nishimoto et al. | |
| 5,089,979 A | 2/1992 | McEachern et al. | |
| 5,099,695 A | 3/1992 | Sugano et al. | |
| 5,187,985 A | 2/1993 | Nelson | |
| 5,193,393 A | 3/1993 | Czarnocki | |
| 5,257,547 A * | 11/1993 | Boyer | 73/756 |
| 5,321,638 A | 6/1994 | Witney | |
| 5,377,128 A | 12/1994 | McBean | |
| 5,460,050 A | 10/1995 | Miyano | |
| 5,507,171 A | 4/1996 | Mattes et al. | |
| 5,522,267 A * | 6/1996 | Lewis | 73/726 |
| 5,544,529 A | 8/1996 | Mitani et al. | |
| 5,578,962 A | 11/1996 | Rastegar | |
| 6,023,978 A | 2/2000 | Dauenhauer et al. | |
| 6,035,721 A | 3/2000 | Krisch | |
| 6,047,244 A | 4/2000 | Rud, Jr. | |
| 6,169,965 B1 | 1/2001 | Kubisiak et al. | |

(Continued)

OTHER PUBLICATIONS

"BDS Series Pressure Sensor," 4 pages, prior to Sep. 6, 2011.

(Continued)

*Primary Examiner* — Lisa Caputo
*Assistant Examiner* — Jermaine Jenkins
(74) *Attorney, Agent, or Firm* — Seager Tufte Wickhem LLC

(57) ABSTRACT

The present disclose relates to sensor including multiple sensor elements. In some cases, the multiple sensor elements may be mounted on a single substrate and each may be configured to sense a single parameter with different resolutions, sensitivities, and/or ranges, and/or the multiple parameters. In one example, multiple pressure sensing die may be mounted in a single package, and each may be configured as a differential pressure sensor, an absolute pressure sensor, and/or a gauge pressure sensor, as desired.

20 Claims, 6 Drawing Sheets

(56) References Cited

U.S. PATENT DOCUMENTS

| | | | |
|---|---|---|---|
| 6,223,593 B1 | 5/2001 | Kubisiak et al. | |
| 6,234,016 B1 | 5/2001 | Bonne et al. | |
| 6,255,728 B1 * | 7/2001 | Nasiri et al. | 257/704 |
| 6,450,005 B1 | 9/2002 | Bentley | |
| 6,502,459 B1 | 1/2003 | Bonne et al. | |
| 6,542,594 B1 | 4/2003 | LeBoulzec | |
| 6,653,959 B1 | 11/2003 | Song | |
| 6,684,711 B2 | 2/2004 | Wang | |
| 6,724,202 B2 | 4/2004 | Tanizawa | |
| 7,055,392 B2 * | 6/2006 | Muchow et al. | 73/715 |
| 7,085,628 B2 | 8/2006 | Ohmi et al. | |
| 7,117,747 B2 | 10/2006 | Borzabadi et al. | |
| 7,146,860 B2 | 12/2006 | Yeh et al. | |
| 7,146,864 B2 | 12/2006 | Sullivan et al. | |
| 7,178,403 B2 * | 2/2007 | Kurtz | 73/754 |
| 7,185,538 B2 | 3/2007 | Hager et al. | |
| 7,239,957 B1 | 7/2007 | Sweet et al. | |
| 7,258,016 B2 | 8/2007 | Maitland, Jr. et al. | |
| 7,266,999 B2 | 9/2007 | Ricks | |
| 7,318,351 B2 | 1/2008 | Cobianu et al. | |
| 7,343,812 B2 | 3/2008 | Stewart et al. | |
| 7,377,177 B1 | 5/2008 | Lamb et al. | |
| 7,458,274 B2 | 12/2008 | Lamb et al. | |
| 7,469,598 B2 | 12/2008 | Shkarlet et al. | |
| 7,497,124 B2 * | 3/2009 | Kuznia et al. | 73/714 |
| 7,520,051 B2 | 4/2009 | Becke et al. | |
| 7,536,917 B2 * | 5/2009 | Baba | 73/754 |
| 7,546,772 B2 * | 6/2009 | Cabuz et al. | 73/715 |
| 7,635,077 B2 | 12/2009 | Schubert | |
| 7,653,494 B2 | 1/2010 | Neacsu et al. | |
| 7,759,945 B2 | 7/2010 | Wade | |
| 7,769,557 B2 | 8/2010 | Bey et al. | |
| 7,775,105 B2 | 8/2010 | Khadkikar et al. | |
| 7,950,286 B2 | 5/2011 | Bentley | |
| 7,995,124 B2 | 8/2011 | Dai | |
| 8,010,322 B2 | 8/2011 | Dmytriw et al. | |
| 8,024,146 B2 | 9/2011 | Bey et al. | |
| 8,304,844 B2 * | 11/2012 | Getman et al. | 257/414 |
| 2007/0000330 A1 | 1/2007 | Tysoe et al. | |
| 2007/0197922 A1 | 8/2007 | Bradley et al. | |
| 2007/0271070 A1 | 11/2007 | Dmytriw et al. | |
| 2010/0268485 A1 | 10/2010 | Bey et al. | |
| 2010/0305465 A1 | 12/2010 | Ricks et al. | |
| 2011/0179879 A1 | 7/2011 | Bentley | |

OTHER PUBLICATIONS

Celerity, Inc., "Dual Range Transducer Display," 2 pages, 2006.
Honeywell, "DCXL-DS Series, SURSENSE Ultra Low Silicon Pressure Sensors," 4 pages, May 2010.
Martel Electronics, "PPC-3300 Precision Dual Range Pressure Calibrator," 2 pages, 2002.
European Search Report for Corresponding Application No. EP-12-18-2495 Dated Jan. 9, 2013.

* cited by examiner

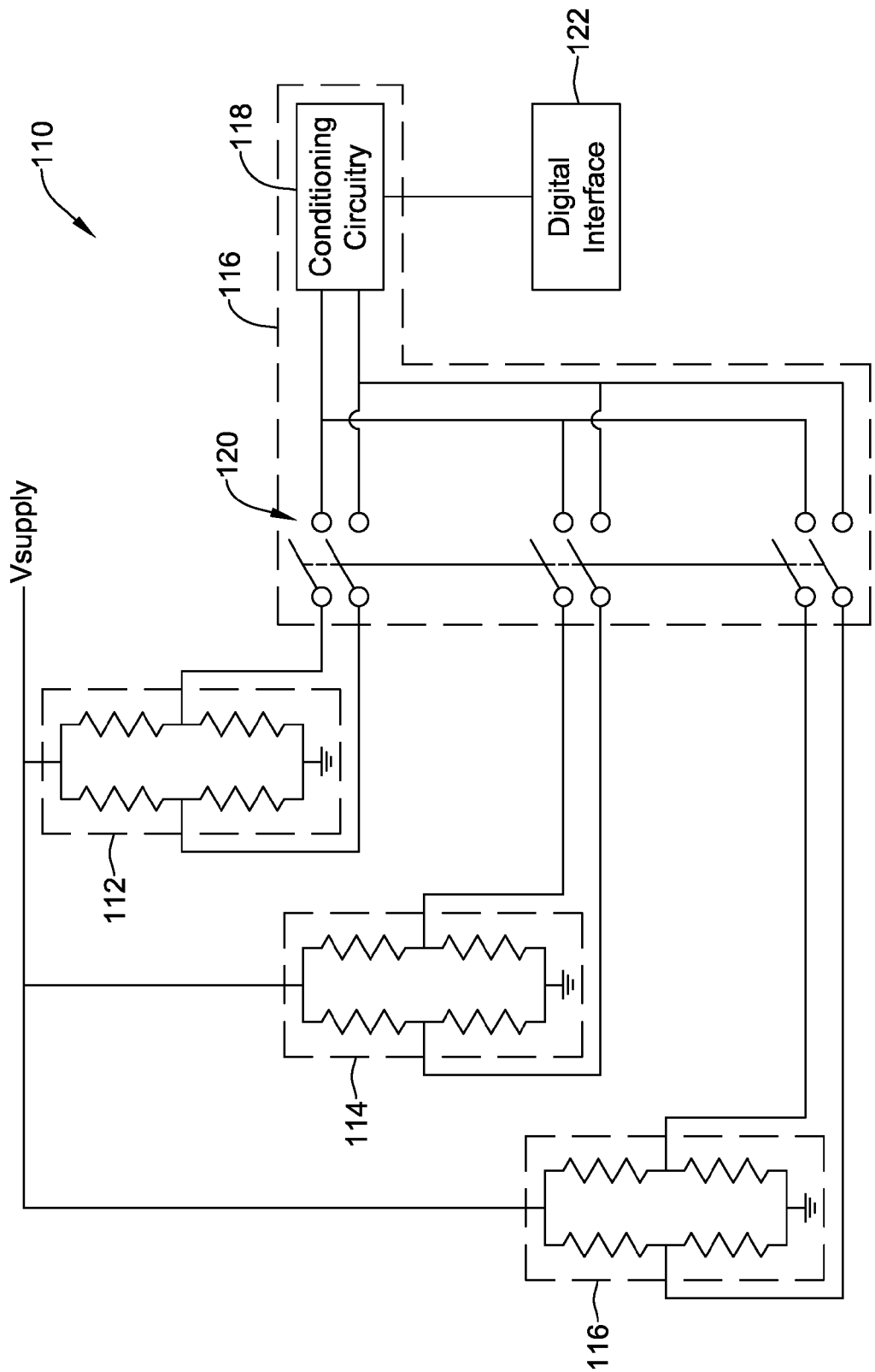

PACKAGED SENSOR WITH MULTIPLE SENSORS ELEMENTS

FIELD

The present disclosure relates generally to packaged sensors.

BACKGROUND

Sensors are commonly used today to sense environmental parameters such as temperature, humidity, pressure, flow, thermal conductivity, gas concentration, light, magnetic fields, electric fields, as well as many other environmental parameters. Such sensors are used in a wide variety of applications including, for example, medical applications, flight control applications, industrial process applications, combustion control applications, weather monitoring applications, water metering applications, as well as many other applications.

SUMMARY

The present disclosure relates generally to sensors, and more particularly, to packaged sensors having multiple sensor elements. In one illustrative embodiment, a packaged pressure sensor is disclosed. While a packaged pressure sensor is used as an example, it is contemplated that the present disclosure may be applied to many other sensor types and/or sensor combinations. For example, the present disclosure may be applied to a packaged flow sensor, a packaged pressure and flow sensor, a packaged pressure and temperature sensor, a packaged pressure, flow, temperature and humidity sensor, and/or any other suitable sensor or sensor combination, as desired.

In one illustrative embodiment, a packaged pressure sensor may include a substrate having a first side and a second side. Two or more pressure sensing die may be mounted to the substrate. In some instances, each of the two or more pressure sensing die may include a diaphragm and one or more piezoresistive elements positioned on the diaphragm. A first housing member may be positioned on the first side of the substrate, and may define a first cavity around the two or more pressure sensing die. The first housing member may include a first pressure opening or port for exposing the first side of the first pressure sensing die and/or the second pressure sensing die to a first pressure. A second housing member may be positioned on the second side of the substrate, and may define a second cavity. In some cases, the second housing member may include a second pressure opening or port for exposing a second side of the first pressure sensing die and/or the second pressure sensing die to a second pressure. In some cases, the two or more pressure sensing die may each be positioned over an opening in the substrate for exposing the second side (e.g. a back-side) of the pressure sensing die to the second pressure, but this is not required. In other cases, the second side of one or more of the pressure sensing die may be exposed to an absolute pressure, rather than a pressure delivered by second pressure opening or port. It is contemplated that the pressure sensing dies may be differential pressure sensing die, gauge pressure sensing die, absolute pressure sensing die, and/or any other suitable pressure sensing die, as desired.

In some instances, the first pressure sensing die may be configured to provide a first resolution of the sensed pressure (e.g. between the first pressure and the second pressure), and the second pressure sensing die may be configured to provide a second resolution of the sensed pressure. The first resolution may be higher than the second resolution. In some cases, the first pressure sensing die may be configured to provide the first resolution of the sensed pressure over a first range, and the second pressure sensing die may be configured to provide the second resolution of the sensed pressure over a second range, wherein the first range is smaller than the second range. In some cases, the first range may at least partially overlap the second range. The first pressure sensing die may, in some cases, be physically more sensitive to the sensed pressure than the second pressure sensing die.

In some cases, the first pressure sensing die may be exposed to a first sensed pressure and the second pressure sensing die may be exposed to a second sensed pressure. For example, in one illustrative embodiment, the first housing member discussed above may include a wall fluidly isolating a first chamber from a second chamber. The first chamber may enclose a first side of the first pressure sensing die, and the second chamber may enclose the first side of the second pressure sensing die. In one embodiment, the first chamber may be in fluid communication with the first pressure opening or port, and the second chamber may be in fluid communication with a third pressure opening or port. In some cases, the second side of the first pressure sensing die and the second side of the second pressure sensing die may be exposed to the same (or different) pressures, depending on the application. Any suitable combination of various sense die and/or housing ports is envisioned.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which:

FIG. 6 is a schematic diagram of an illustrative pressure sensor assembly.

DESCRIPTION

Figure 1:
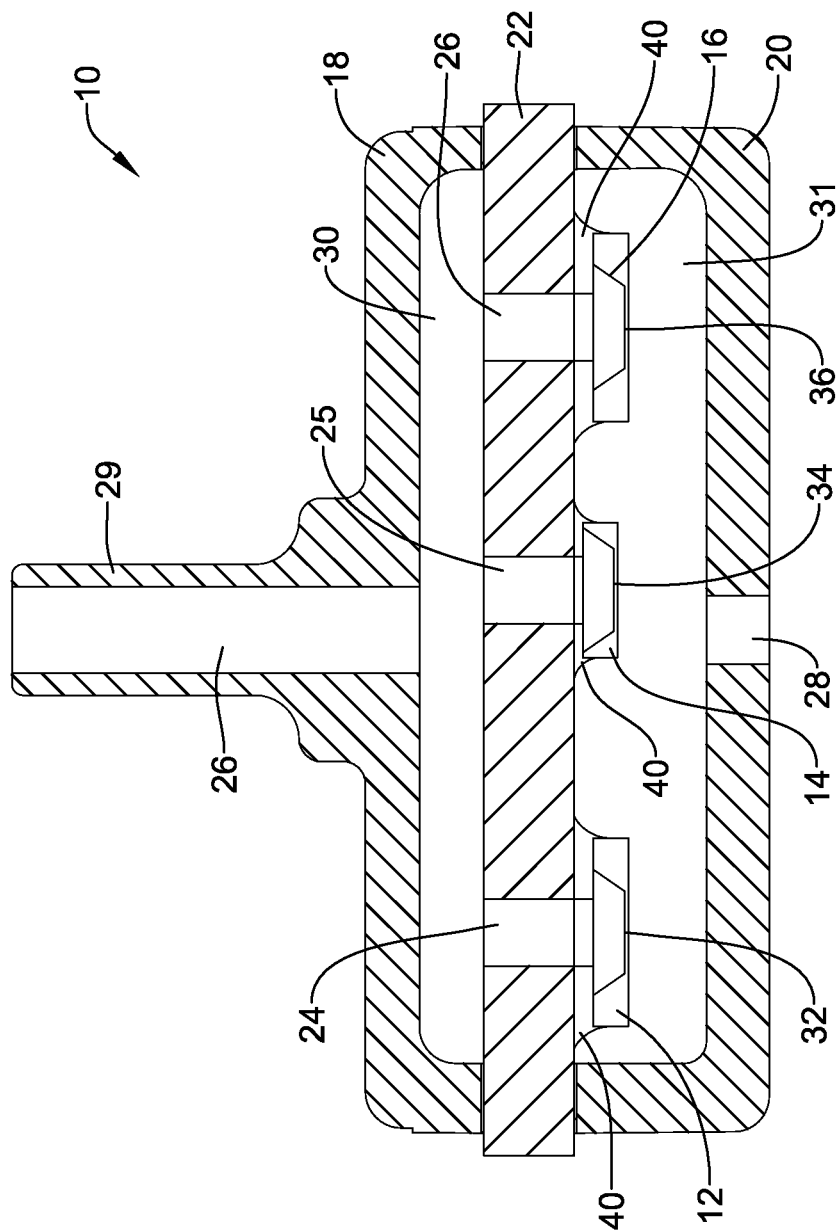
FIG. 1 is a cross-sectional view of an illustrative pressure sensor having multiple sensing die.

The following description should be read with reference to the drawings wherein like reference numerals indicate like elements throughout the several views. The description and drawings show several embodiments which are meant to be illustrative of the disclosure.

FIG. 1 is a cross-sectional view of an illustrative pressure sensor 10 having multiple sensing die 12, 14, and 16. While a packaged pressure sensor 10 is used as an example, it is contemplated that the present disclosure may be applied to many other sensor types and/or sensor combinations. For example, the present disclosure may be applied to a packaged flow sensor, a packaged pressure and flow sensor, a packaged pressure and temperature sensor, a packaged pressure, flow, temperature and humidity sensor, and/or any other suitable sensor or sensor combination, as desired.

In the illustrative embodiment of FIG. 1, the pressure sensing die 12, 14, and 16 are shown mounted on a single package substrate 22. Although three pressure sensing die are shown in FIG. 1, pressure sensor 10 may include two or more, three or more, four or more, five or more, six or more, or any other number of sensing die, as desired.

In the illustrative embodiment, the multiple pressure sensing die 12, 14, and 16 may be configured to measure multiple pressure measurements for a single application. For example, two or more of the pressure sensing die 12, 14, and 16 can be configured to sense the same pressure, but may have different sensitivities or resolutions and may sense the pressure over different ranges. That is, one of the pressure sensing die 12, 14, and 16 may have a relatively high sensitivity over a relatively narrow range, and another one of the pressure sensing die 12, 14, and 16 may have a relatively low sensitivity over a relatively broad range. In some cases, the pressure sensing die that has the relatively high sensitivity over a relatively narrow range may have a sensing diaphragm that is larger and/or thinner than the sensing diaphragm of the pressure sensing die that has the relatively low sensitivity over a relatively broad range.

It is also contemplated that a third one of the pressure sensing die 12, 14, and 16, or any other number of pressure sensing die, may operate at one or more intermediate sensitivity over one or more intermediate ranges. In this example, it is contemplated that the two or more of the pressure sensing die 12, 14, and 16 may be absolute or gauge pressure sensors, differential pressure sensors, or any other type of pressure sensor as desired. In some cases, the output of the pressure sensing die 12, 14, and 16 can be input into one or more analog-to-digital converters (ADC), sometimes after amplification and/or conditioning. When the output of two or more pressure sensing die 12, 14, and 16 that have different physical sensitivities are multiplexed into a single ADC, a higher resolution measurement may be made by the higher resolution sense die at lower pressures over a smaller range of pressure, and a lower resolution measurement may be made by the lower resolution sense die over a larger range of pressure. This may also allow the use of a less expensive, lower resolution, faster ADC, while still providing high resolution at lower pressure.

In some cases, the ranges of the two or more of the pressure sensing die 12, 14, and 16 may overlap, but this is not required. We so provided, the output of one or the pressure sensing die 12, 14, and 16 may be compared to an output of another overlapping pressure sensing die 12, 14, or 16 to help determine if there is an error such as drift in the output of the pressure sensing die 12, 14, and 16. This may, in some cases, reduce the need for external calibration and/or testing of the pressure sensing die 12, 14, and 16 during operation.

In some embodiments, the multiple pressure sensing die 12, 14, and 16 may be configured to sense different pressures. For example, one or more of the pressure sensing die 12, 14, and 16 may be configured to sense a pressure differential between a pressure common to at least some of the other pressure sensing die 12, 14, and 16 and a second pressure. In some situations, the pressure differential may be taken across an orifice to determine, for example, fluid flow in a process application. In some cases, one or more of the pressure sensing die 12, 14, and 16 may be configured as absolute pressure sensors for measuring an input pressure relative to an absolute reference pressure.

In some illustrative embodiments, the pressure sensing die 12, 14, and 16 may be a micromechanical sensor element fabricated using a silicon wafer and suitable fabrication techniques. The pressure sensing die 12, 14, and 16 may have one or more pressure sensing elements and/or other circuitry (e.g. trim circuitry, signal conditioning circuitry, etc.) formed using suitable fabrication or printing techniques. In some cases, the pressure sensing die 12, 14, and 16 may each include a pressure sensing diaphragm 32, 34, and 36 including one or more sensing elements, such as piezoresistive sensing components, formed thereon for sensing a deflection and thus a pressure differential between a top and bottom side of the pressure sensing diaphragms 32, 34, and 36. In some cases, the pressure sensing diaphragms 32, 34, and 36 may be fabricated by back-side etching a silicon wafer, however, it is contemplated that any suitable process may be used, as desired.

When provided, the piezoresistive components may have an electrical resistance that varies according to an applied mechanical stress (e.g. pressure sensing diaphragm deflection). In some cases, the piezoresistive components may include a silicon piezoresistive material, however, other non-silicon materials may be used. In some cases, the piezoresistive components may be connected in a Wheatstone bridge configuration (full or half bridge). It is to be understood that the piezoresistive components are only one example of a pressure sensing element that can be used, and it is contemplated that any other suitable sensing elements may be used, as desired.

In some cases, the pressure sensing die 12, 14, and 16 may be mounted to the substrate 22 using adhesive 40, such as a silicone, RTV, a silicone-epoxy, a soft epoxy, or a regular or hard epoxy, or other suitable bonding mechanism. The package substrate 22 may include a ceramic or fiberglass material, however, other suitable material may be used as desired. In some cases, the adhesive 40 may have a thickness providing mechanical stress isolation between the pressure sensing die 12, 14, and 16 and the package substrate 22 such that the pressure sensing die 12, 14, and 16 is effectively unconstrained relative to the package substrate 22. In some cases, the thickness of adhesive 40 may be thick enough for adequate adherence of pressure sense die 12, 14, and 16 to substrate 22, but not so thick so as to interfere with the bonding or diaphragm of pressure sense die 12, 14, and 16. In other cases, the pressure sensing die 12, 14, and 16 may be mounted to the substrate 22 using any other suitable bonding mechanism (e.g. solder, eutectic, fusion bonding, etc.). Additionally, in some instances, an intervening isolation layer(s) or glass layer(s) may or may not be provided between the pressure sensing die 12, 14, and 16 and the package substrate 22, as desired.

In some cases, the pressure sensing die 12, 14, and 16 may be mounted over openings 24, 25, and 27 in the package substrate 22 that are sized to expose the back side of the pressure sensing diaphragms, 32, 34, and 36 to the top side of the package substrate 22. In this instance, a pressure applied to the top side of pressure sensor 10 may be transmitted to the back side of pressure sensing diaphragms 32, 34, and 36 via openings 24, 25, and 27.

In some embodiments, although not shown in FIG. 1, the pressure sensor 10 may include optional signal conditioning circuitry mounted on substrate 22. In some cases, the signal conditioning circuitry may include an ASIC (Application Specific Integrated Circuit) or other electronics. In some cases, the optional signal conditioning circuitry may include amplification, analog-to-digital conversion (ADC), offset compensation circuitry, and/or other suitable signal conditioning electronics. When so provided, the signal conditioning circuitry may receive an analog signal from the pressure sensing die 12, 14, and/or 16, and condition and/or process the signal for transmission from the pressure sensor 10. While an ASIC die is used as one example, it is contemplated that signal conditioning circuitry may include any suitable signal conditioning circuitry including any a suitable microprocessor, microcontroller, or discrete components, as desired.

In some cases, signal conditioning circuitry may be mounted to the package substrate 22 and may be electrically connected to pressure sensing die 12, 14, and/or 16 via wire bonds (e.g. direct die-to-die wire bonds), trace conductors formed on the package substrate 22, and/or any other suitable electrical connection.

In the illustrative embodiment of FIG. 1, a protective housing may be provided. The protective housing may include a top protective cover 18 defining a cavity 30, and a bottom protective cover 20 defining a cavity 31 for the pressure sensing die 12, 14, and 16. As illustrated, the top protective cover 18 is disposed on a top side of the substrate 22. The bottom protective cover 20 is disposed on a bottom side of the substrate 22. With such a configuration, the top and bottom protective covers 18 and 20 may help protect the pressure sensing element of pressure die 12, 14, and 16. In some cases, the top protective cover 18 and the bottom protective cover 20 may be formed from, for example, plastic, polyamide, ceramic, metal, or any other suitable material. In some cases, these covers may be attached to the substrate with the same or substantially the same "footprint" on each side, but this is not required.

In the illustrative embodiment shown in FIG. 1, the top protective cover 18 may define a pressure port 29 for exposing the pressure sensing element (e.g. bottom side of pressure sensing diaphragms 32, 32, and 36) to a first input pressure of a media. While the top protective cover 18 is shown as a single part, it is contemplated that top protective cover 18 may be formed as separate members, if desired.

In the illustrative embodiment of FIG. 1, the bottom protective cover 20 may define a cavity 31 and may also include a pressure opening 28 for exposing the pressure sensing element (e.g. top side of pressure sensing diaphragms 32, 32, and 36) to a second input pressure. The bottom protective cover 20 may include a single part, but this is not required. While the bottom protective cover 20 is shown as a single part, it is contemplated that bottom protective cover 20 may be formed as separate members, if desired.

In the illustrative embodiment of FIG. 1, the pressure sensing elements may be configured to sense a pressure differential between the pressure opening in pressure port 29 and the pressure opening 28. A signal corresponding to the sensed pressure difference may be transmitted to an optional signal conditioning circuitry (not shown) for conditioning. While the foregoing pressure sensor 10 is shown as a differential or gauge pressure sensor, it is contemplated that the housing may only include one of openings 26 and 28 for absolute, vacuum or other reference pressure sensor applications, as desired.

In the illustrative embodiment, the pressure sensor 10 may include one or more electrical leads (not shown) mounted to the package substrate 22 and electrically connected to any optional signal conditioning circuitry or the pressure sensing element via one or more traces, for receiving a signal corresponding to the pressure sensed by the pressure sensing elements (e.g. pressure sensing diaphragm 32, 34, and 36). In some cases, the one or more electrical leads may include metal, however, any suitable material may be used, as desired, including conductive polymers.

In some cases, multiple signal paths for each sensing die 12, 14, and 16 may be provided. Example signal paths are disclosed in U.S. application Ser. No. 12/389,042, filed Feb. 19, 2009 and titled "MULTI-RANGE PRESSURE SENSOR APPARATUS AND METHOD UTILIZING A SINGLE SENSE DIE AND MULTIPLE SIGNAL PATHS", which is hereby incorporated by reference.

Figure 2:
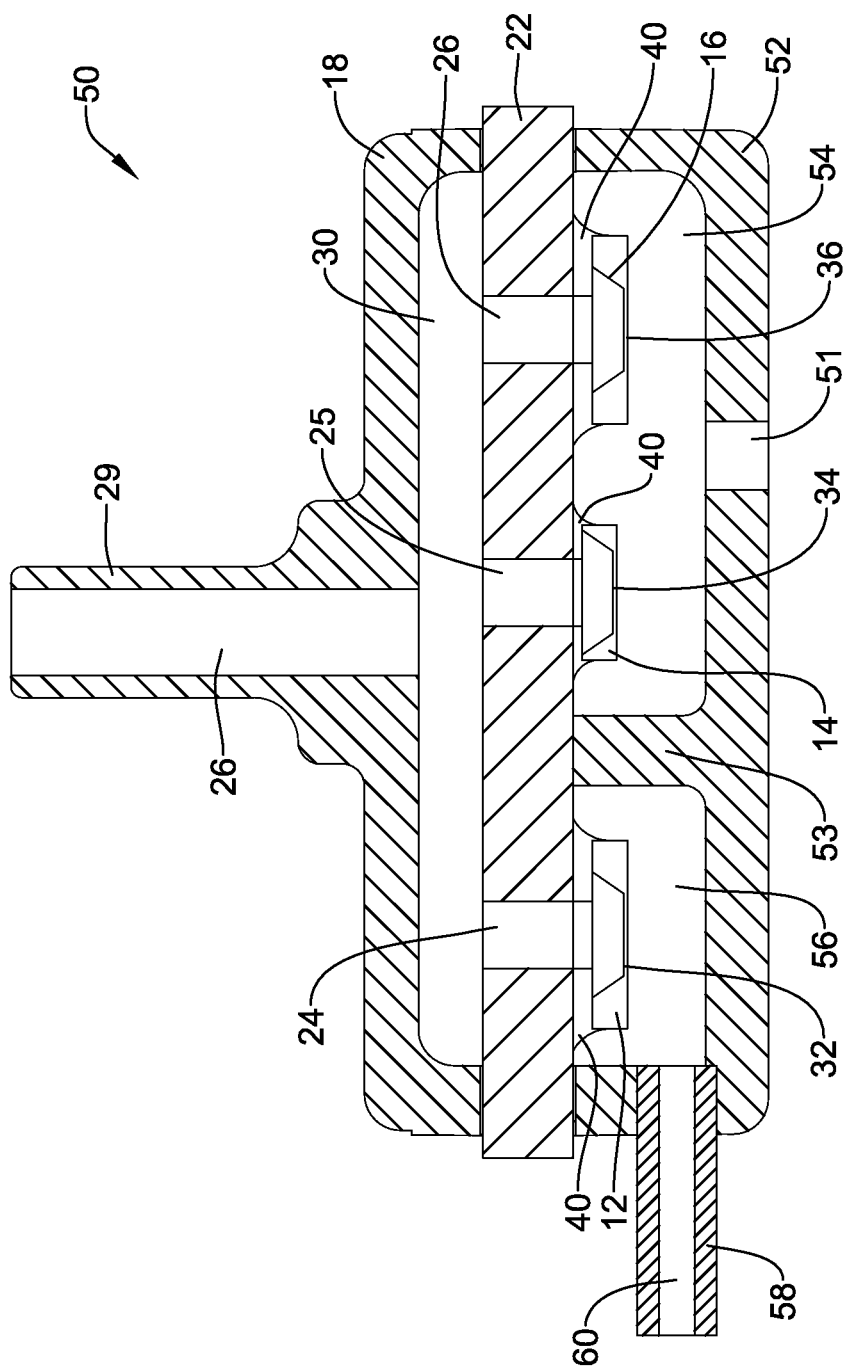
FIG. 2 is a cross-sectional view of another illustrative pressure sensor having multiple sensing die.

FIG. 2 is a cross-sectional view of another illustrative pressure sensor 50 having multiple sensing die 12, 14, and 16. Pressure sensor 50 is similar in many respects to pressure sensor 10, but has a bottom protective cover 52 including a wall 53 that defines multiple cavities 54 and 56 for exposing pressure sensing die 12, 14, and 16 to different pressures. As shown, two cavities are provided, however, it is contemplated that two or more cavities, three or more cavities, four or more cavities, five or more cavities, or any other number of cavities may be provided, as desired.

As illustrated, the bottom protective cover 52 defines a pressure opening 51 for exposing the pressure sensing die 14 and 16 to an input pressure, such as, for example, atmospheric pressure. The bottom protective cover 52 also define a pressure port 58 having a pressure opening 60 for exposing pressure sensing die 12 to an input pressure from another pressure source. In the illustrative embodiment, the bottom protective cover 20 may include a single part, but this is not required. While the bottom protective cover 20 is shown as a single part, it is contemplated that bottom protective cover 20 may be formed as separate members, if desired.

In this instance, pressure sensing die 12 may be configured as a differential pressure sensor and may sense a differential pressure between pressure port 29 and pressure port 58. Pressure sensing die 14 and 16 may be configured as gauge pressure sensors to sense a pressure from pressure port 29 relative to atmospheric pressure. In some instances, pressure sensing die 16 may have a relatively higher sensitivity over a relatively narrow range, and pressure sensing die 14 may have a relatively lower sensitivity over a relatively broad range of pressures. In some cases, the pressure sensing die 16 may have a sensing diaphragm 36 that is larger and/or thinner than the sensing diaphragm 34 of the pressure sensing die 14.

In some cases, the output of the pressure sensing die 12, 14, and 16 can be input into one or more analog-to-digital converters (ADC), sometimes after amplification and/or conditioning. When the output of the pressure sensing die 14 and 16, which may have different physical sensitivities, are multiplexed into a single ADC, a higher resolution measurement may be made by the higher resolution sense die 16 at lower pressures over a smaller range, and a lower resolution measurement may be made by the lower resolution sense die 14 over a larger range of pressure. This may allow the use of a less expensive, lower resolution, faster ADC, while still providing high resolution at lower pressures.

In some cases, the ranges of the pressure sensing die 14 and 16 may overlap, but this is not required. We so provided, the output of pressure sensing 14 may be compared to an output of pressure sensing die 16 when the pressure in the overlapping range, to help determine if there is an error such as drift in the output of either pressure sensing die 14 and 16. This may, in some cases, reduce the need for external calibration and/or testing of the pressure sensing die 14 and 16 during operation.

Figure 3:
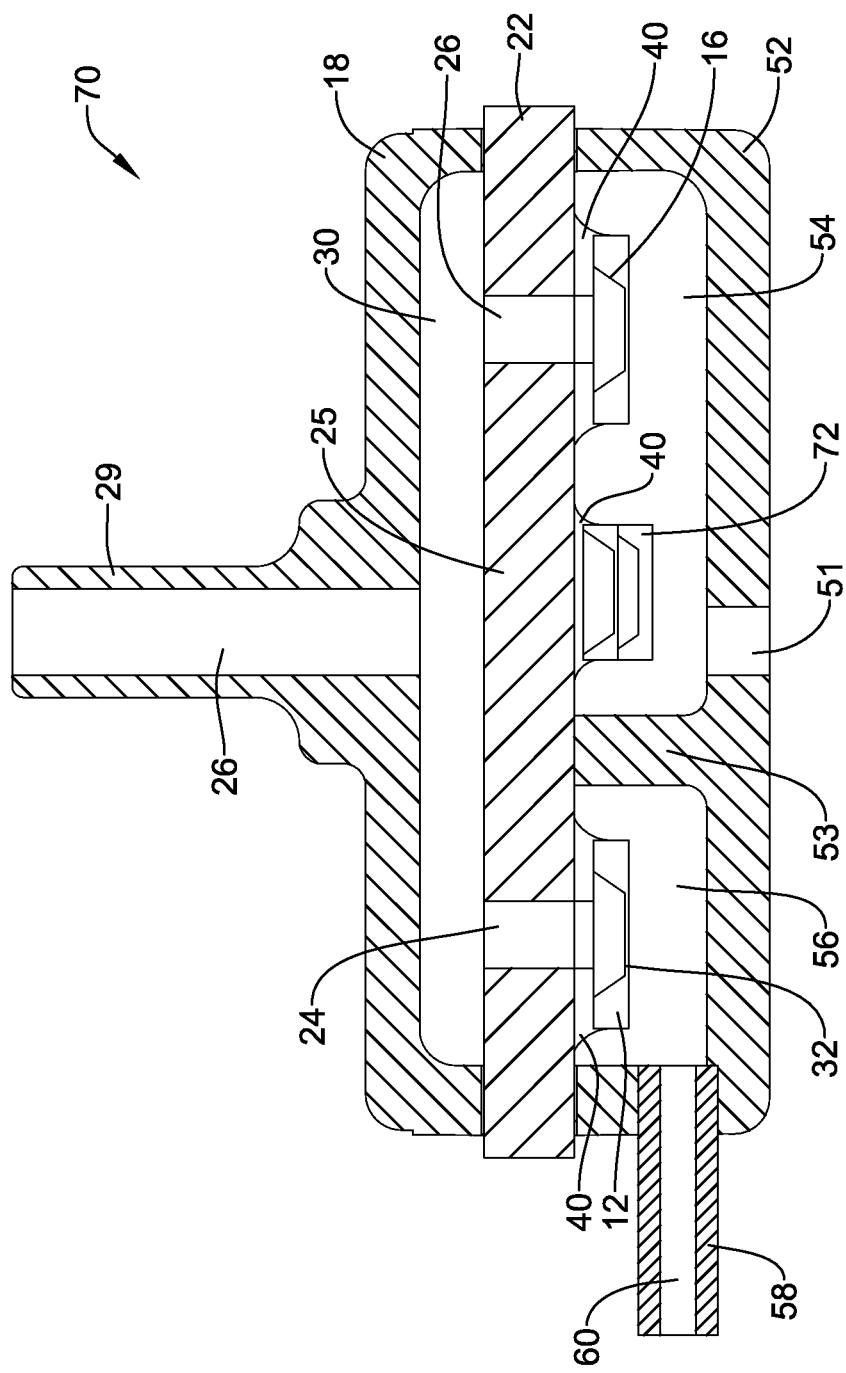
FIG. 3 is a cross-sectional view of another illustrative pressure sensor having multiple sensing die.

FIG. 3 is a cross-sectional view of another illustrative pressure sensor 70 having multiple pressure sensing die 12, 72, and 16. Pressure sensor 70 is similar in many respects to pressure sensor 50 except that pressure sensing die 72 is an absolute pressure sensing die, and opening 25 is not provided in the package substrate 22. In other words, pressure sensing die 72 may be fabricated to have a vacuum reference pressure, and may sense the atmospheric pressure via opening 51. When so provided, pressure sensing die 72 may be configured to sense an external barometric pressure.

Figure 4:
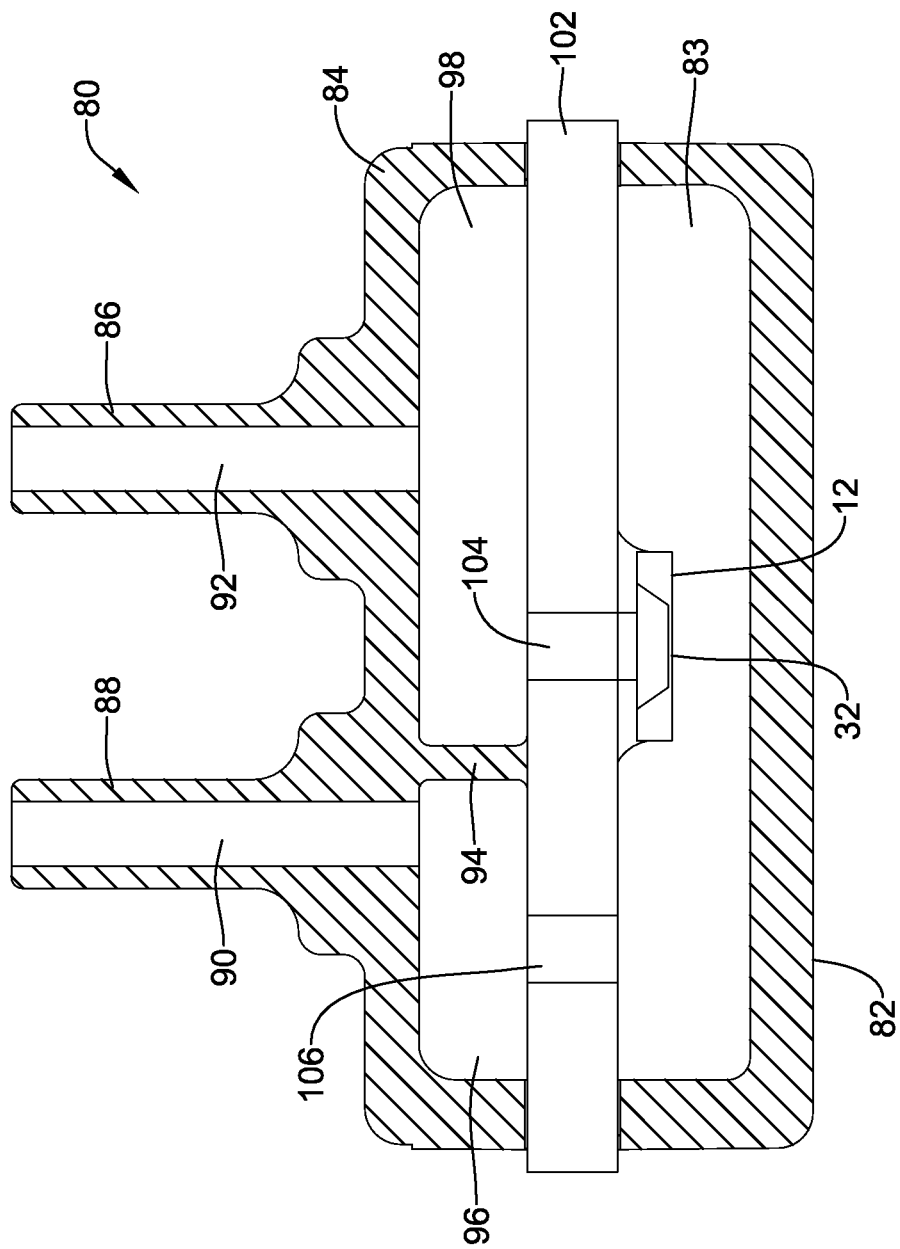
FIG. 4 is a cross-sectional end view of another illustrative pressure sensor having multiple sensing die.

FIG. 4 is a cross-sectional end view of another illustrative pressure sensor 80 having multiple sensing die 12, 14, and 16 mounted on package substrate 102. The illustrative pressure sensor 80 may be similar to pressure sensor 50, except that both flow ports 86 and 88 are formed in the top protective cover 84 instead of having a side port. That is, bottom protective cover 82 may be similar to bottom protective cover 52 without port 58, and substrate 102 may be similar to substrate 22 with the addition of opening 104.

The top protective cover 84 may include a wall 94 defining multiple cavities 96 and 98 for exposing pressure sensing die 12 to two pressures. The top protective cover 84 may define a pressure port 86 having a pressure opening 92 in fluid communication with cavity 98, and a pressure port 88 having a pressure opening 90 in fluid communication with cavity 96. In the illustrative embodiment, the back-side of pressure sensing diaphragm 32 of pressure sensing die 12 may be exposed to a pressure from pressure port 86 via opening 104 in the substrate 102, and a front side of the pressure sensing diaphragm 32 of pressure sensing die 12 may be exposed to a pressure from pressure port 88 via opening 106 in substrate 102.

In the illustrative embodiment, only pressure sensing die 12 is shown since this an end view. However, pressure sensing die 14 and 16 can also be included (and may be situated behind pressure sensing die 12 in FIG. 4). Similar to above, pressure sensing die 14 and 16 may be exposed to a pressure from pressure port 86 via openings formed in substrate 102, similar to as discussed above.

Figure 5:
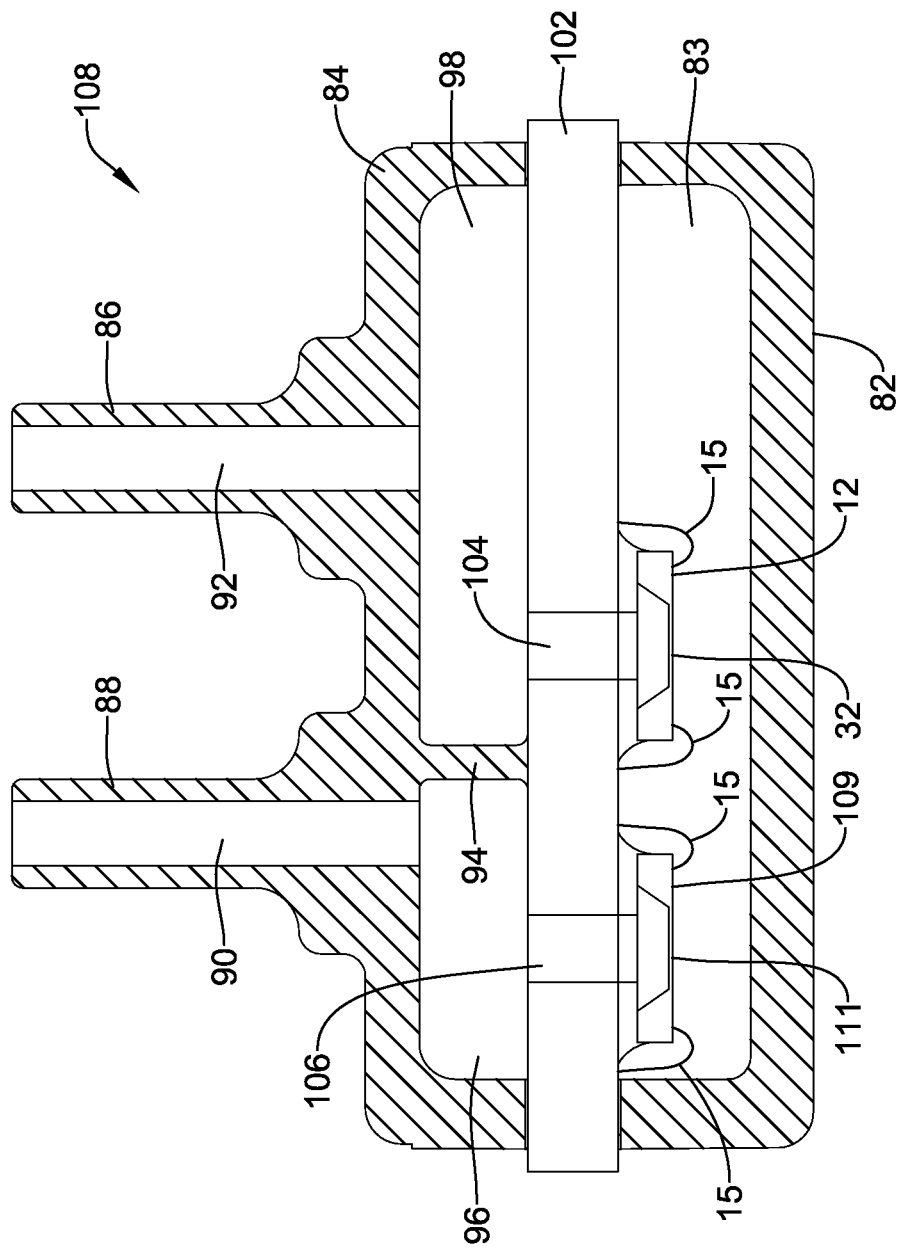
FIG. 5 is a cross-sectional end view of another illustrative pressure sensor having multiple sensing die.

FIG. 5 is a cross-sectional end view of another illustrative pressure sensor 108 having multiple sensing die 12, 14, and 16 mounted on package substrate 102. Although not shown, the pressure sensing diaphragms 32 and 111 of pressure sensing die 12 and 109, respectively, may be electrically connected to one or more traces on the package substrate via wire bonds (not shown). In the illustrative embodiment, pressure sensing die 12 and 109 may be configured to sense a differential pressure between pressure ports 86 and 88 without exposing the wire bonds 15 to the media. In this case, an output signal of pressure sensing die 12 may be compared to an output signal of pressure sensing die 109, and the difference may relate to the pressure differential between pressure ports 86 and 88.

FIG. 6 is a schematic diagram of an illustrative pressure sensor assembly 110. In the illustrative embodiment, the pressure sensor assembly 110 includes a plurality of pressure sensing die 112, 114, and 116 that may be mounted to a package substrate (not shown). Each of the pressure sensing die 112, 114, and 116 may include a number of sensing elements, such as sensor resistors. In the illustrative embodiment, the resistors are arranged in a Wheatstone bridge configuration, but this is not required in all embodiments.

At least one of the resistors may be piezoresistive sensing components for sensing a deflection and thus a pressure differential between a top and bottom side of the corresponding pressure sensing diaphragm. When so provided, the piezoresistive components may be configured to have an electrical resistance that varies according to an applied mechanical stress (e.g. pressure sensing diaphragm deflection). In some cases, the piezoresistive components may include a silicon piezoresistive material, however, other non-silicon materials may be used. In some cases, the piezoresistive components may be connected in a Wheatstone bridge configuration (full or half bridge). It is to be understood that the piezoresistive components are only one example of a pressure sensing element that can be used, and it is contemplated that any other suitable sensing elements may be used, as desired.

As illustrated, a positive supply voltage and a negative supply voltage (e.g. ground) may be provided to the bridges of sensing die 112, 114, and 116. An output of the bridges may be connected to signal processing circuitry 117. In the illustrative embodiment, the signal processing circuitry 117 may be implemented in an integrated circuit, such as an application specific integrated circuit (ASIC), if desired. However, this is not required. For example, signal processing circuitry 117 may be implemented as discrete electrical components secured to a printed circuit board, and/or may be implemented as some combination of hardware and software, as desired.

As illustrated, signal processing circuitry 117 include a multiplexer circuit 120 and conditioning circuitry 118. The multiplexer circuit 120 may be coupled to the outputs of the pressure sensing die 112, 114, and 116, and may selectively provide a selected output to the conditioning circuitry 118. As shown, the multiplexer 120 is internal to the signal processing circuitry 117, but it may be external to the signal processing circuitry 117, if desired.

Conditioning circuitry 118 may be electrically coupled to an output of the multiplexer 120 and may include, for example, amplification, digitization (ADC), linearization, temperature compensation, calibration, translation, as well as other functions, as desired. The conditioning circuitry 118 may receive the analog output signal from the Wheatstone bridges and provide at least one digital output signal at a digital interface 122. As illustrated, the conditioning circuitry 118 may provide a single output, however, it is contemplated that multiple outputs, sometimes each of which having a different dynamic range and/or resolution, may be provided. In some cases, it is contemplated that the output of conditioning circuitry 118 may be or include an analog output signal, if desired.

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A pressure sensor comprising:
a substrate including a first side and a second side;
a first pressure sensing die mounted on the first side of the substrate, wherein the first pressure sensing die includes a diaphragm and one or more piezoresistive elements positioned on the diaphragm, wherein the first pressure sensing die is positioned over a first opening in the substrate, the first opening extending between the first side and the second side of the substrate;
a second pressure sensing die mounted on the first side of the substrate, wherein the second pressure sensing die includes a diaphragm and one or more piezoresistive elements positioned on the diaphragm;
a first housing member positioned on the first side of the substrate and defining a first cavity around the first pressure sensing die and the second pressure sensing die, wherein the first housing member includes a first pressure opening for exposing the first pressure sensing die and/or the second pressure sensing die to a first pressure; and a second housing member positioned on the second side of the substrate and defining a second cavity, wherein the second housing member includes a second pressure opening for exposing the first pressure sensing die and/or the second pressure sensing die to a second pressure.

2. The pressure sensor of claim 1, wherein the second pressure sensing die is positioned over a second opening in the substrate, the second opening extending between the first side and the second side of the substrate.

3. The pressure sensor of claim 2, wherein the first pressure sensing die is configured to provide a first resolution of a sensed pressure and the second pressure sensing die is configured to provide a second resolution of the sensed pressure, wherein the first resolution is higher than the second resolution.

4. The pressure sensor of claim 3, wherein the first pressure sensing die is configured to provide the first resolution of the sensed pressure over a first range and the second pressure sensing die is configured to provide the second resolution of the sensed pressure over a second range, wherein the first range is smaller than the second range.

5. The pressure sensor of claim 1, wherein the first housing member includes a third pressure opening and a wall defining a first chamber and a second chamber, wherein the first chamber houses the first pressure sensing die and is exposed to the first pressure opening and the second chamber houses the second pressure sensing die and is exposed to the third pressure opening.

6. The pressure sensor of claim 5, wherein the third pressure opening is exposed to atmosphere and the second pressure sensing die is an absolute pressure sensing die configured to measure barometric pressure.

7. The pressure sensor of claim 5, wherein the second pressure sensing die is positioned over a second opening in the substrate, the second opening extending between the first side and the second side of the substrate, wherein the third pressure opening is exposed to atmosphere and the second pressure sensing die is a gauge pressure sensing die.

8. The pressure sensor of claim 1, wherein the second housing member includes a third pressure opening and a wall defining a first chamber and a second chamber, wherein the first chamber is in fluid communication with the first pressure sensing die via the first opening in the substrate and the second chamber is in fluid communication with the first pressure sensing die via a second opening in the substrate.

9. The pressure sensor of claim 1, further comprising a third pressure sensing die mounted on the first side of the substrate, wherein the third pressure sensing die includes a diaphragm and one or more piezoresistive elements positioned on the diaphragm.

10. The pressure sensor of claim 1, further comprising:
a multiplexer electrically connected to an output of each of the first pressure sensing die and the second pressure sensing die, the multiplexer having an output; and
signal conditioning circuitry electrically connected to the output of the multiplexer.

11. A pressure sensor comprising:
a substrate;
a first pressure sensing die mounted on the substrate, wherein the first pressure sensing die includes a diaphragm and one or more piezoresistive elements positioned on the diaphragm;

a second pressure sensing die mounted on the substrate, wherein the second pressure sensing die includes a diaphragm and one or more piezoresistive elements positioned on the diaphragm;
a third pressure sensing die mounted on the substrate, wherein the third pressure sensing die includes a diaphragm and one or more piezoresistive elements positioned on the diaphragm;
a housing positioned on the substrate and defining one or more cavities around the first pressure sensing die, the second pressure sensing die, and the third pressure sensing die;
wherein the first pressure sensing die, the second pressure sensing die, and the third pressure sensing die are configured to sense different parameters and/or have different resolutions.

12. The pressure sensor of claim 11, wherein at least one of the first pressure sensing die, the second pressure sensing die, and third pressure sensing die is a differential pressure sensor.

13. The pressure sensor of claim 11, wherein at least one of the first pressure sensing die, the second pressure sensing die, and third pressure sensing die is a gauge pressure sensor.

14. The pressure sensor of claim 11, wherein at least one of the first pressure sensing die, the second pressure sensing die, and third pressure sensing die is an absolute pressure sensor configured to sense barometric pressure.

15. A pressure sensor comprising:
a substrate including a first side and a second side;
a first pressure sensing die mounted on the first side of the substrate, wherein the first pressure sensing die includes a diaphragm and one or more piezoresistive elements positioned on the diaphragm, wherein the first pressure sensing die is positioned over a first opening in the substrate, the first opening extending between the first side and the second side of the substrate;
a second pressure sensing die mounted on the first side of the substrate, wherein the second pressure sensing die includes a diaphragm and one or more piezoresistive elements positioned on the diaphragm, wherein the second pressure sensing die is positioned over a second opening in the substrate, the second opening extending between the first side and the second side of the substrate; and
a first housing member positioned on the first side of the substrate and defining a first cavity around the first pressure sensing die and the second pressure sensing die.

16. The pressure sensor of claim 15, further comprising a second housing member positioned on the second side of the substrate and defining a second cavity having a first chamber, wherein the second housing member includes a first pressure opening for exposing the first pressure sensing die to a first pressure via the first opening and a second pressure opening for exposing the second pressure sensing die to a second pressure via the second opening.

17. The pressure sensor of claim 16, wherein a difference between the first pressure and the second pressure can be determined by a difference between an output signal of the first pressure sensing die and an output signal of the second pressure sensing die.

18. The pressure sensor of claim 17, wherein the only a back-side of the pressure sensing diaphragm of each of the first pressure sensing die and the second pressure sensing die is exposed to the first pressure or the second pressure.

19. The pressure sensor of claim 15, wherein the first pressure sensing die is configured to provide a first resolution of a sensed pressure over a first range and the second pressure sensing die is configured to provide a second resolution of the sensed pressure, wherein the first resolution is higher than the second resolution and the first range is narrower than the second range.

20. The pressure sensor of claim 15, wherein the first pressure sensing die is a differential pressure sensing die exposed to a first and second pressure and the second pressure sensing die is a gauge pressure sensor exposed to the first pressure.

\* \* \* \* \*